United States Patent
Kim et al.

(10) Patent No.: US 9,194,442 B2
(45) Date of Patent: Nov. 24, 2015

(54) DUAL CLUTCH DEVICE FOR VEHICLE

(71) Applicant: Hyundai Motor Company, Seoul (KR)

(72) Inventors: Min Sung Kim, Seoul (KR); Sungik Bae, Suwon-si (KR); Kyungha Kim, Yongin-si (KR); Hee Ra Lee, Anyang-si (KR); Yeonho Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 13/736,611

(22) Filed: Jan. 8, 2013

(65) Prior Publication Data
US 2013/0341153 A1    Dec. 26, 2013

(30) Foreign Application Priority Data
Jun. 21, 2012  (KR) .................. 10-2012-0066915

(51) Int. Cl.
*F16D 23/00* (2006.01)
*F16D 13/72* (2006.01)
*F16D 21/06* (2006.01)

(52) U.S. Cl.
CPC ............ *F16D 23/00* (2013.01); *F16D 13/72* (2013.01); *F16D 2021/0684* (2013.01); *F16D 2300/0214* (2013.01); *F16D 2300/26* (2013.01)

(58) Field of Classification Search
CPC .................................................. F16D 23/00
See application file for complete search history.

(56) References Cited

U.S. PATENT DOCUMENTS

| | | | |
|---|---|---|---|
| 2005/0285457 A1* | 12/2005 | Tsutsui et al. | 310/54 |
| 2006/0144665 A1* | 7/2006 | Janson et al. | 192/48.8 |
| 2009/0102298 A1* | 4/2009 | Savant et al. | 310/52 |
| 2012/0080248 A1* | 4/2012 | Kasuya et al. | 180/65.21 |
| 2012/0091835 A1* | 4/2012 | Kim et al. | 310/54 |
| 2012/0178574 A1* | 7/2012 | Grochowski et al. | 310/54 |
| 2012/0217825 A1* | 8/2012 | Kasuya et al. | 310/54 |
| 2013/0111891 A1* | 5/2013 | Iwase et al. | 60/347 |

FOREIGN PATENT DOCUMENTS

| | | |
|---|---|---|
| JP | 2005-308121 A | 11/2005 |
| JP | 2011-126320 A | 6/2011 |
| JP | 2012-102813 A | 5/2012 |
| KR | 10-0370966 B | 1/2003 |
| KR | 2003-0016598 A | 3/2003 |
| KR | 10-2009-0037730 A | 4/2009 |

* cited by examiner

*Primary Examiner* — Rodney H Bonck
(74) *Attorney, Agent, or Firm* — Morgan, Lewis & Bockius LLP

(57) ABSTRACT

A dual clutch device for a vehicle may include a drive motor provided in a motor housing, a clutch housing connected to the motor housing wherein a clutch may be provided in the clutch housing, and a cooling oil flowing unit forming a hydraulic line fluid-connecting the motor housing and the clutch housing and supplying a cooling oil to the drive motor and the clutch through the hydraulic line.

12 Claims, 3 Drawing Sheets

DUAL CLUTCH DEVICE FOR VEHICLE

CROSS-REFERENCE TO RELATED APPLICATION

The present application claims priority to Korean Patent Application No. 10-2012-0066915 filed on Jun. 21, 2012, the entire contents of which is incorporated herein for all purposes by this reference.

BACKGROUND OF THE INVENTION

1. Field of the Invention

The present invention relates to a dual clutch device for a vehicle. More particularly, the present invention relates to a dual clutch device for a vehicle which cools a clutch of the vehicle using a cooling mechanism of a drive motor.

2. Description of Related Art

Generally, a continuously variable transmission (CVT) is used as a transmission of a hybrid electric vehicle. A metal belt that can change an engine speed within a gear range irrespective of a vehicle speed is applied to the continuously variable transmission.

The continuously variable transmission (CVT) using the metal belt, however, uses relatively high hydraulic pressure compared with other automatic transmission. Therefore, the continuously variable transmission (CVT) has many drawbacks in efficiency regardless of excellent functionality.

Recently, use of a dual clutch transmission (DCT) is increasing. The dual clutch transmission has merits of excellent efficiency of a manual transmission and convenience of an automatic transmission. According to the dual clutch transmission, a plurality of input gears is disposed on two input shafts and any one of a plurality of output gears engaged with the plurality of input gears is selectively connected to any one of two output shafts by means of a synchronizer device. Thereby, a shift is performed.

According to a conventional dual clutch transmission, however, a cooling circuit may be very complicated and lubrication performance may be insufficient. Therefore, shift feel may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a dual clutch device for a vehicle having advantages of improving shift feel due to improvement of lubrication performance by cooling the dual clutch device using a cooling mechanism of a drive motor without using additional components.

In an aspect of the present invention, a dual clutch device for a vehicle may include a drive motor provided in a motor housing, a clutch housing connected to the motor housing wherein a clutch is provided in the clutch housing, and a cooling oil flowing unit forming a hydraulic line fluid-connecting the motor housing and the clutch housing and supplying a cooling oil to the drive motor and the clutch through the hydraulic line.

The cooling oil flowing unit may include an inlet formed at an upper portion of the motor housing, an outlet formed at a lower portion of the motor housing, a cooling channel formed between the motor housing and the drive motor and fluid-connected to the inlet and the outlet, and a connecting line fluid-connecting the cooling channel with an inside of the clutch housing, wherein the cooling oil is supplied in the cooling channel through the inlet, and wherein the cooling oil is discharged from the cooling channel and the clutch housing through the outlet.

The connecting line is formed slanted inwardly from the motor housing toward the clutch.

The dual clutch device may include a cap member mounted at the inlet or the outlet.

The cap member is threaded to a screw thread formed at an interior circumference of the inlet or the outlet.

The connecting line may include an upper connecting line fluid-connected to the inlet, the cooling channel and the inside of the clutch housing.

The connecting line may include a lower connecting line fluid-connected to the outlet, the cooling channel and the inside of the clutch housing.

In another aspect of the present invention, a dual clutch device for a vehicle may include a motor housing provided with an inlet receiving a cooling oil therethrough and an outlet discharging the cooling oil therefrom, a drive motor mounted in the motor housing, wherein the motor housing is provided with a cooling channel fluid-connected to the inlet and the outlet, a clutch housing connected to the motor housing, a clutch mounted in the clutch housing, and a connecting line formed at a wall formed between the motor housing and the clutch housing and dividing the drive motor from the clutch, and fluid-connecting the cooling channel to an inside of the clutch housing.

The dual clutch device may include a cap member threaded to the inlet or the outlet of the motor housing.

The connecting line is formed slanted inwardly from the drive motor to the clutch.

The inlet is formed at an upper portion of the motor housing and the outlet is formed at a lower portion of the motor housing.

The connecting line may include an upper connecting line fluid-connected to the inlet, the cooling channel and the inside of the clutch housing.

The connecting line may include a lower connecting line fluid-connected to the outlet, the cooling channel and the inside of the clutch housing.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
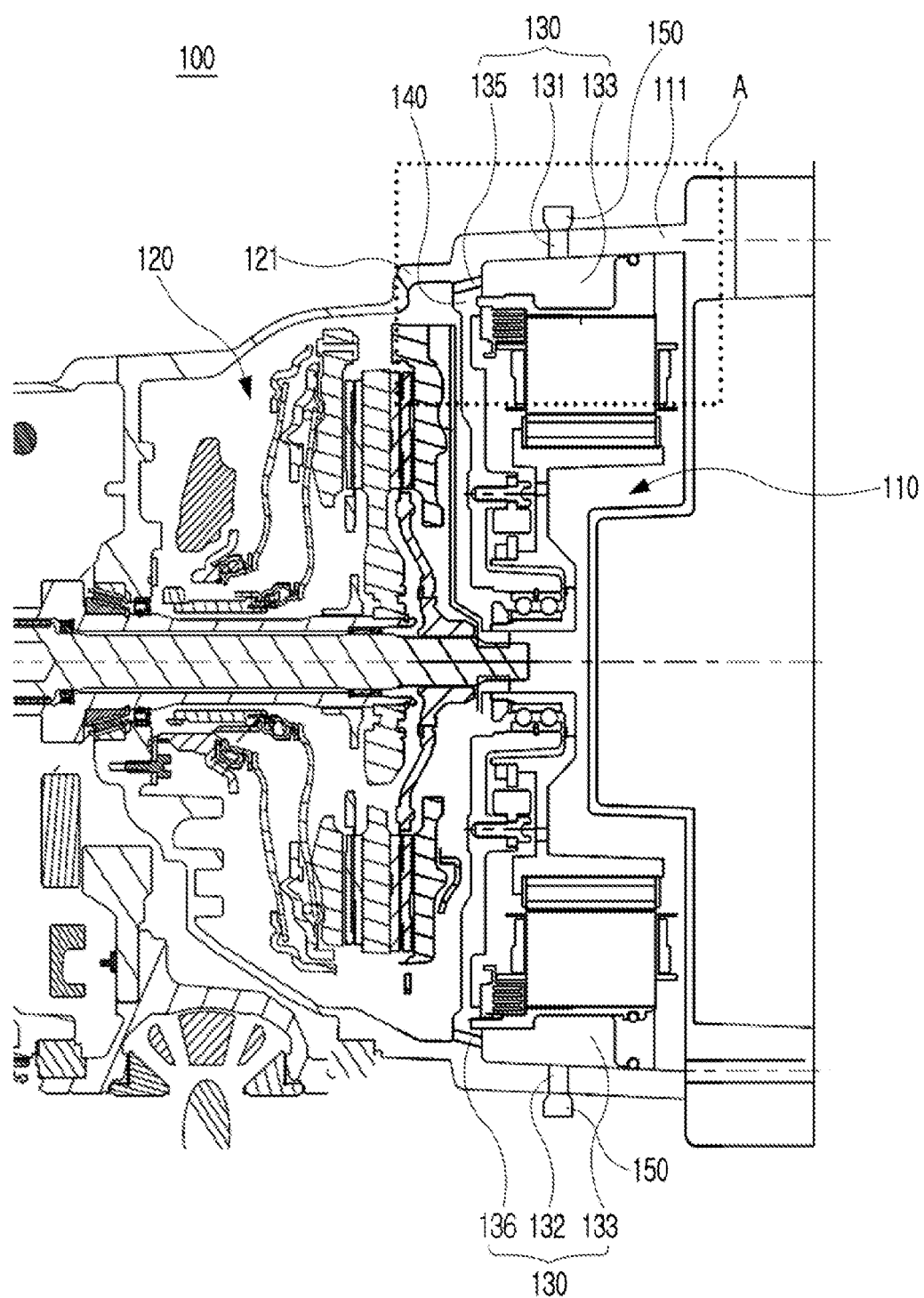
FIG. 1 is a cross-sectional view of a dual clutch device for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiment will be omitted, and the same constituent elements are denoted by the same reference numerals in this specification.

Since size and thickness of each component illustrated in the drawings are arbitrarily represented for ease of explanation, the present invention is not limited to the drawings. Thicknesses of many parts and regions are enlarged.

Figure 2:
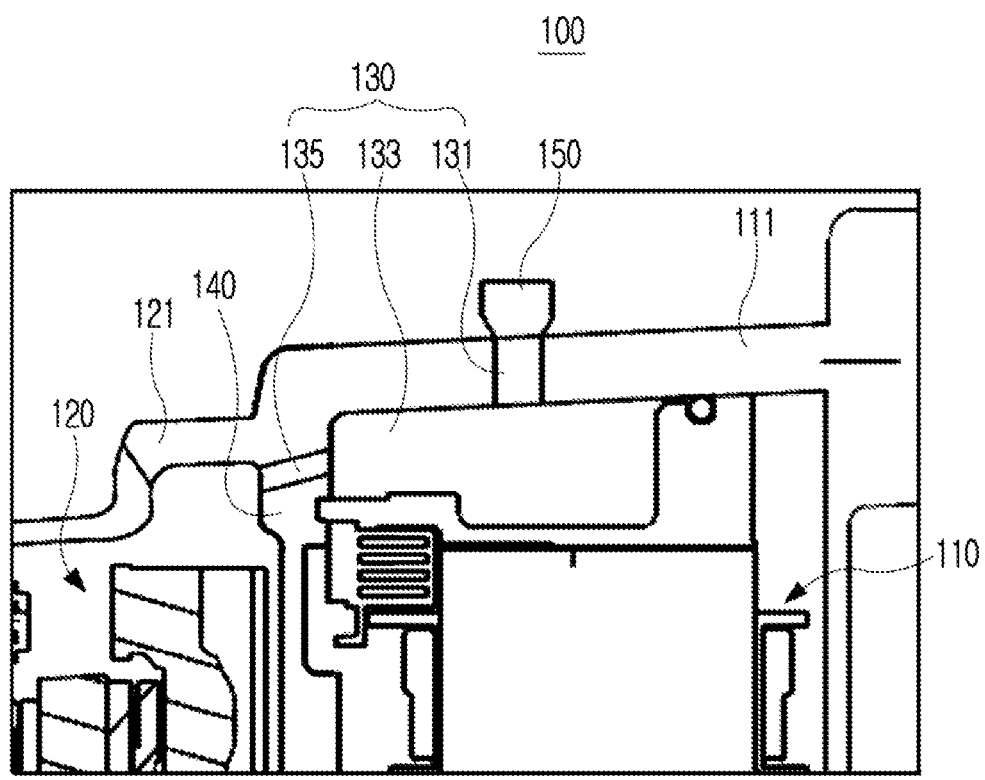
FIG. 2 is an enlarged view of "A" region in FIG. 1.
Figure 3:
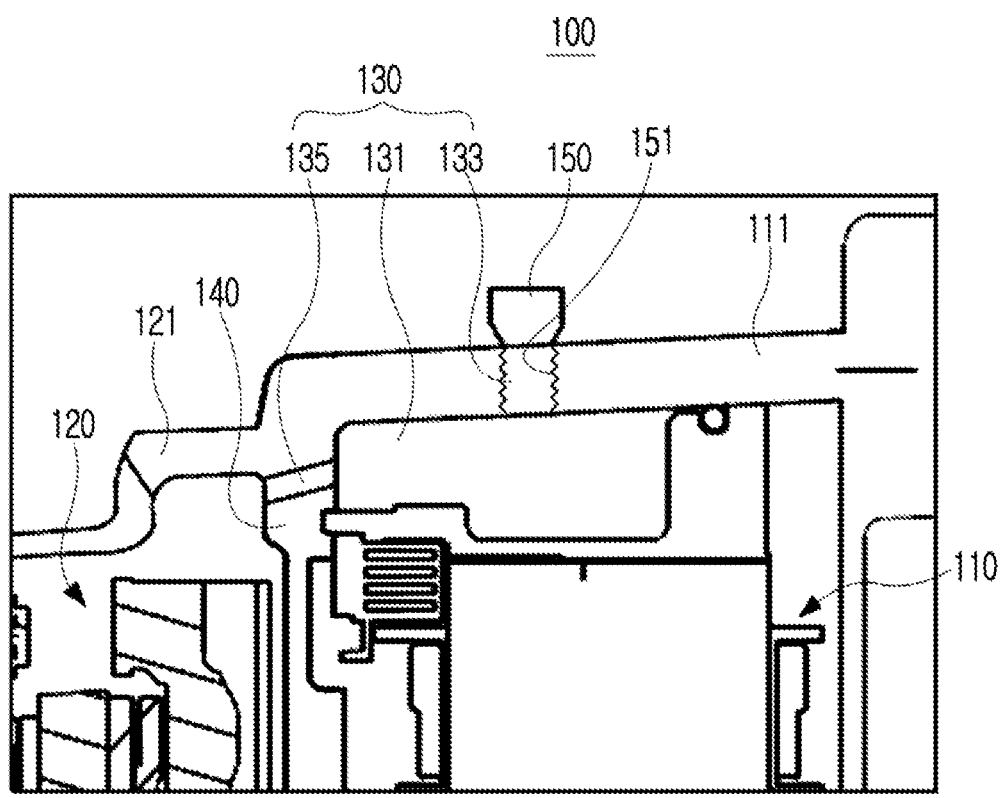
FIG. 3 is a cross-sectional view illustrating thread-coupling of a cap member shown in FIG. 2.

FIG. 1 is a cross-sectional view of a dual clutch device for a vehicle according to an exemplary embodiment of the present invention, FIG. 2 is an enlarged view of "A" region in FIG. 1, and FIG. 3 is a cross-sectional view illustrating thread-coupling of a cap member shown in FIG. 2.

Referring to FIG. 1 and FIG. 2, a dual clutch device 100 for a vehicle according to an exemplary embodiment of the present invention is adapted to cool a clutch 120 of a vehicle using cooling mechanism of a drive motor 110 without using additional components. Therefore, a length and a size of the clutch 120 may be reduced without changing a layout of a conventional transmission, and shift feel may be improved by improving lubrication performance of the clutch 120.

For these purposes, the dual clutch device 100 for a vehicle according to an exemplary embodiment of the present invention includes the drive motor 110, the clutch 120, and a cooling oil flowing unit 130, and each component will be described in detail.

The drive motor 110 is mounted in a motor housing 111.

The clutch 120 includes a clutch housing 121 connected to the motor housing 111 and is mounted in the clutch housing 121.

In an exemplary embodiment of the present invention, the cooling oil flowing unit 130 forms a hydraulic line connecting the drive motor 110 with the clutch 120 through the motor housing 111, and supplies a cooling oil to the drive motor 110 and the clutch 120 through the hydraulic line.

The cooling oil flowing unit 130 includes an inlet 131, an outlet 132, a cooling channel 133, and connecting lines 135 and 136.

The inlet 131 is formed at an upper portion of the motor housing 111 so as to flow the cooling oil in the motor housing 111, and the outlet 132 is formed at a lower portion of the motor housing 111 so as to discharge the cooling oil from the motor housing 111.

Cap members 150 are mounted respectively at the inlet 131 and the outlet 132 formed at the motor housing 111.

The cap members 150, as shown in FIG. 3, may be threaded to screw threads 151 formed at interior circumferences of the inlet 131 and the outlet 132 of the motor housing 111.

In addition, the cooling channel 133 is connected to the inlet 131 and the outlet 132 and is formed between the motor housing 111 and the drive motor 110.

The cooling channel 133 is a space in which the cooling oil flows and which is adapted to cool the drive motor 110.

The connecting lines 135 and 136 are formed at a wall 140 formed between the motor housing 111 and the clutch housing 121 and dividing the drive motor 110 from the clutch 120. The connecting lines 135 and 136 connect the cooling channel 133 with an inside of the clutch housing 121.

In addition, the connecting lines 135 and 136 are formed slanted inwardly toward the clutch 120 with respect to the drive motor 110 in a radial direction. Therefore, the cooling oil flowing into the cooling channel 133 through the inlet 131 is flowed into the clutch 120 easily and the cooling oil cooling the clutch 120 is exhausted from the clutch 120 through the outlet 132.

That is, if the cooling oil flows into the cooling channel 133 through the inlet 131 formed at the upper portion of motor housing 111, the cooling oil flows into the clutch housing 121 through the upper connecting line 135 and cools the clutch 120. After that, the cooling oil flows out to cooling channel 133 through the lower connecting line 136, and then is exhausted to the exterior of the motor housing 111 through the outlet 132 formed at the lower portion of the motor housing 111.

Therefore, the dual clutch device 100 for a vehicle according to an exemplary embodiment of the present invention can cool the clutch 120 of the vehicle simultaneously with the drive motor 110 using the cooling mechanism of the drive motor 110 without using additional components. Therefore, a length and a size of the clutch 120 may be reduced without changing a layout of a conventional transmission, and shift feel may be improved by improving lubrication performance of the clutch 120.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A dual clutch device for a vehicle comprising:
a drive motor provided in a motor housing;
a clutch housing connected to the motor housing wherein a clutch is provided inside the clutch housing; and
a cooling oil flowing unit forming a hydraulic line fluid-connecting the motor housing and the clutch housing and supplying a cooling oil to the drive motor and the clutch through the hydraulic line,
wherein the cooling oil flowing unit includes:
an inlet formed at an upper portion of the motor housing;
an outlet formed at a lower portion of the motor housing;

a cooling channel formed between the motor housing and the drive motor and fluid-connected to the inlet and the outlet; and a connecting line directly fluidically connecting the cooling channel with the inside of the clutch housing, wherein the cooling oil is supplied in the cooling channel through the inlet, and wherein the cooling oil is discharged from the cooling channel and the clutch housing through the outlet.

2. The dual clutch device of claim 1, wherein the connecting line is formed slanted inwardly from the motor housing toward the clutch.

3. The dual clutch device of claim 1, further including a cap member mounted at the inlet or the outlet.

4. The dual clutch device of claim 3, wherein the cap member is threaded to a screw thread formed at an interior circumference of the inlet or the outlet.

5. The dual clutch device of claim 1, wherein the connecting line include:

an upper connecting line fluid-connected to the inlet, the cooling channel and the inside of the clutch housing.

6. The dual clutch device of claim 1, wherein the connecting line include:

a lower connecting line fluid-connected to the outlet, the cooling channel and the inside of the clutch housing.

7. A dual clutch device for a vehicle including:

a motor housing provided with an inlet receiving a cooling oil therethrough and an outlet discharging the cooling oil therefrom;

a drive motor mounted in the motor housing, wherein the motor housing is provided with a cooling channel fluid-connected to the inlet and the outlet, a clutch housing connected to the motor housing;

a clutch mounted in the clutch housing; and a connecting line formed at a wall formed between the motor housing and the clutch housing and separating the drive motor from the clutch, and directly fluidically connecting the cooling channel to an inside of the clutch housing.

8. The dual clutch device of claim 7, further including a cap member threaded to the inlet or the outlet of the motor housing.

9. The dual clutch device of claim 7, wherein the connecting line is formed slanted inwardly from the drive motor to the clutch.

10. The dual clutch device of claim 7, wherein the inlet is formed at an upper portion of the motor housing and the outlet is formed at a lower portion of the motor housing.

11. The dual clutch device of claim 7, wherein the connecting line include:

an upper connecting line fluid-connected to the inlet, the cooling channel and the inside of the clutch housing.

12. The dual clutch device of claim 7, wherein the connecting line include:

a lower connecting line fluid-connected to the outlet, the cooling channel and the inside of the clutch housing.

* * * * *